No. 891,675. PATENTED JUNE 23, 1908.
W. S. DE CAMP.
PNEUMATIC ADJUSTER FOR ANGLE COCKS ON TRAIN PIPES.
APPLICATION FILED MAR. 17, 1908.
2 SHEETS—SHEET 1.
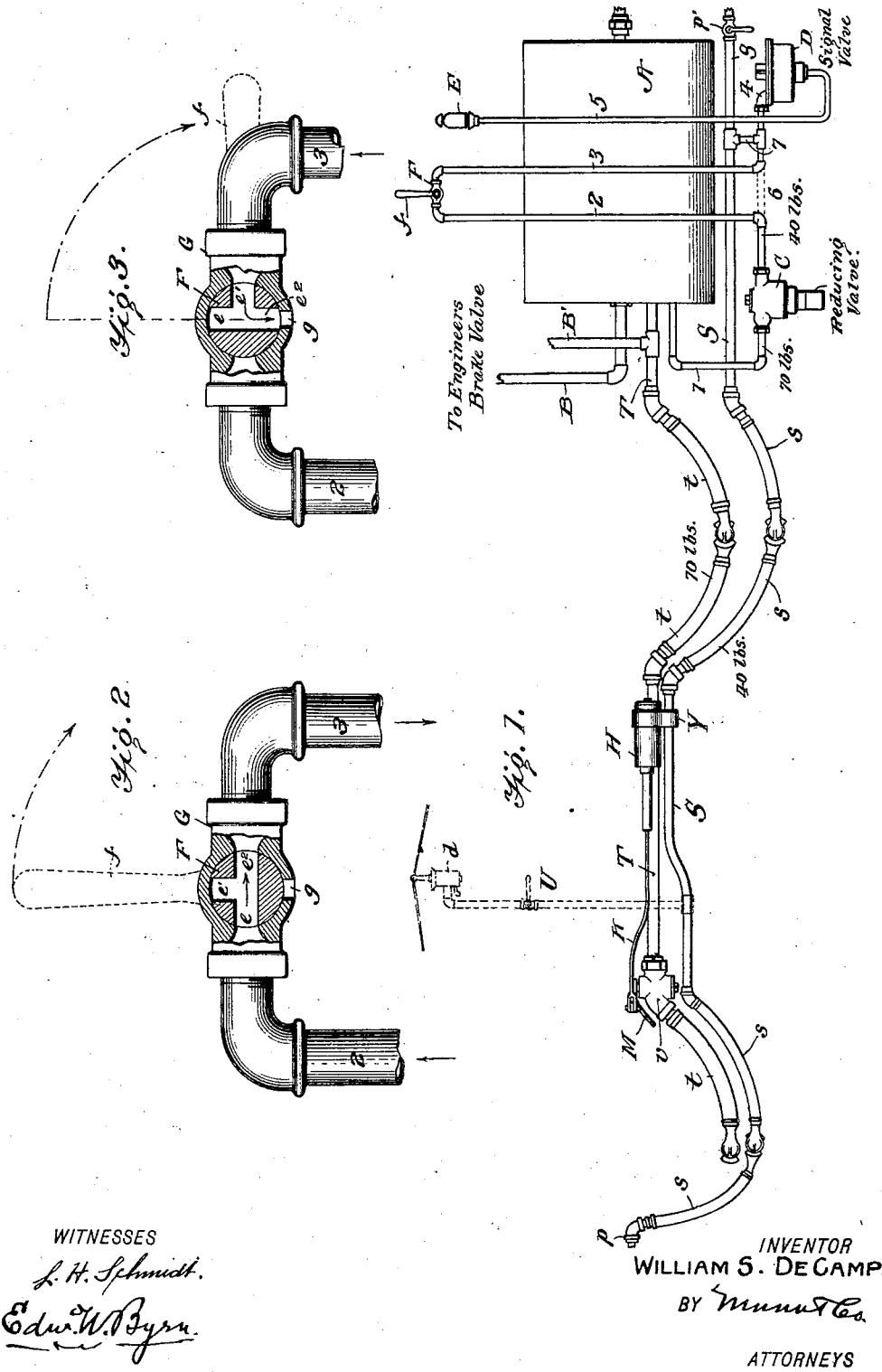
WITNESSES
INVENTOR
WILLIAM S. DE CAMP,
BY
ATTORNEYS

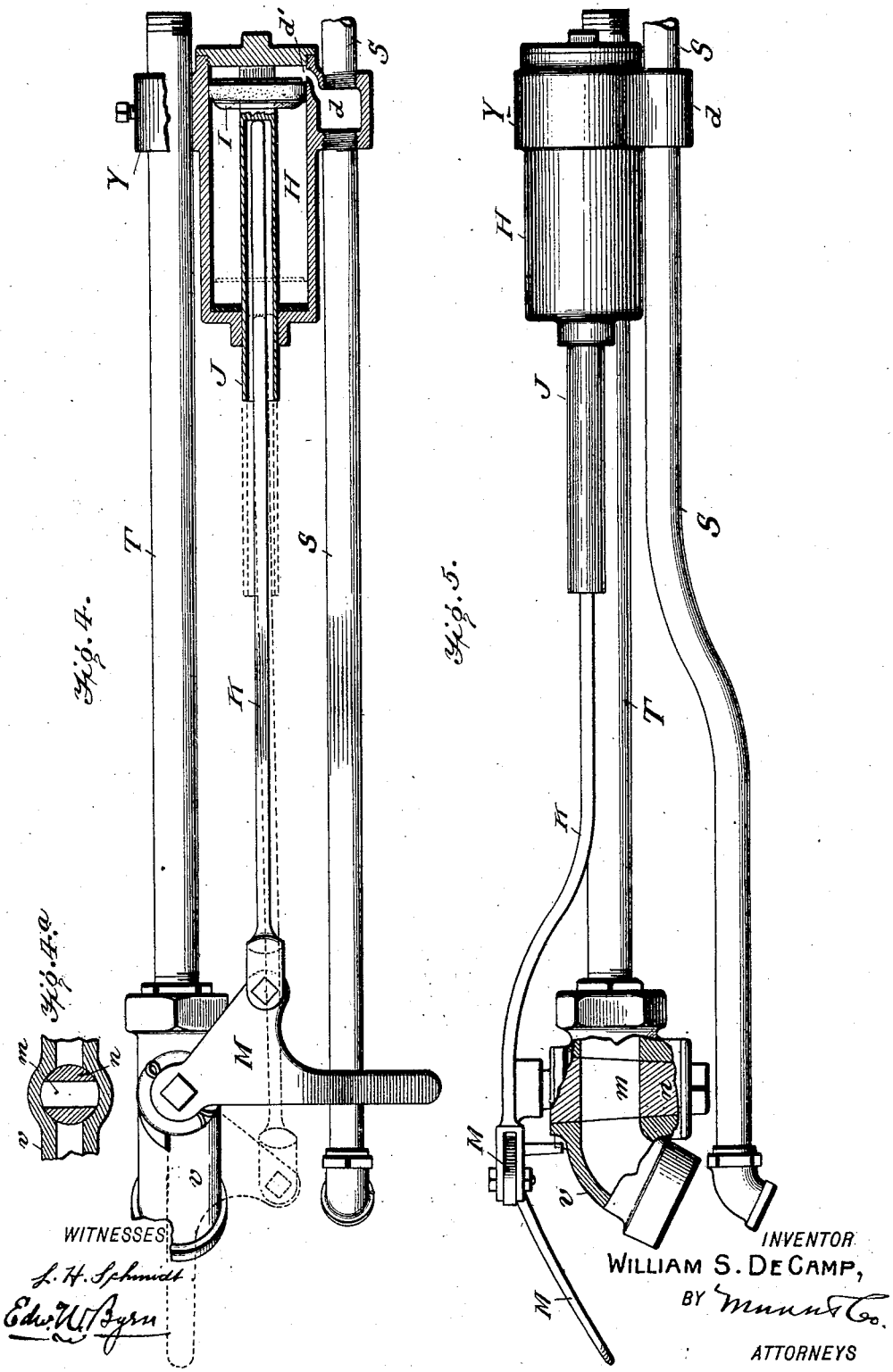

UNITED STATES PATENT OFFICE.

WILLIAM S. DE CAMP, OF CHILLICOTHE, OHIO.

PNEUMATIC ADJUSTER FOR ANGLE-COCKS ON TRAIN-PIPES.

No. 891,675.

Specification of Letters Patent.

Patented June 23, 1908.

Application filed March 17, 1908. Serial No. 421,633.

*To all whom it may concern:*

Be it known that I, WILLIAM S. DE CAMP, a citizen of the United States, and resident of Chillicothe, in the county of Ross and State of Ohio, have invented a new and useful Improvement in Pneumatic Adjusters for Angle-Cocks on Train-Pipes, of which the following is a specification.

In the Westinghouse system of air brakes it is common to employ a train pipe which carries the air through the train, the connection for which train pipe between the cars is made by flexible hose couplings and angle-cocks which are capable of closing the end of a train pipe at its junction with the hose pipe. In connection with this brake system, it is also common to use a signal pipe charged with air at a lower pressure than that contained in the train pipe, which signal pipe is by means of suitable appliances utilized for enabling the conductor at any portion of the train to communicate with the engineer. For this purpose each car is provided with a suitable discharge valve by which the air pressure in the signal pipe is reduced and which reduction of air pressure through a signal valve on the locomotive is made to blow a whistle and thus apprise the engineer of the communication from the conductor. As will be readily understood, the signal pipes of the car are required to be connected by a hose coupling at points between the cars in the same manner as the brake hose coupling for the brake pipe. It has also been necessary to provide at each end of the signal pipe on a car a stop cock which is required to be turned off by hand whenever the hose coupling between the cars is separated for disconnecting one or more cars of the train. The necessity for thus turning off this stop cock is apparent, since otherwise it would result in the exhaustion of the air from the signal pipe and also from the main reservoir. After any car has been disconnected in the train and the stop cock of the signal pipe turned off, and it becomes necessary to reconnect such car to the same or any other train, it will be seen that it also necessary for the brakeman to again open such closed stop cock in order to permit a through communication with the signal pipes of the other cars of the train. If it should happen that the brakeman should fail to thus open this closed stop cock it will be seen that all that portion of the train on the off side from the locomotive from said closed stop cock would be rendered inoperative. In like manner it will be apparent that if any angle-cock in the train pipe has been turned off and inadvertently left so after the car is coupled up in the train, then in such case the brakes on the off side of this angle-cock from the locomotive are also rendered inoperative with results which may be disastrous.

In a separate application for a patent filed March 17, 1908, Serial No. 421,634, I have shown and described an invention whose object is first to dispense with all stop cocks in the signal pipe and thereby secure an economy in construction, but, more important still, to dispense with the necessity for any attention on the part of the brakeman to this signal pipe beyond the mere coupling of the hose, and also to place the operative or non-operative condition of the signal pipe within the range of observation of the engineer and under his immediate control in the cab. To these ends that invention consisted in interposing between the reducing valve for the main reservoir and the signal valve of the engineer's whistle, a three-way cock by means of which the continuity of the air from the main reservoir to the signal pipe may be maintained, or the air cut off from the signal pipe at the will of the engineer.

My present invention has for its object to extend these same desirable results to the control of all angle-cocks in the brake system by the engineer who at a glance can thus tell the operative position of the angle-cocks and open them up if inadvertently left closed.

This invention therefore consists of the novel construction and arrangement of parts whereby the engineer through the signal pipe has perfect control over the opening of the angle-cocks, without interfering with the independent manual closing of any angle-cock by a brakeman in separating the train.

Figure 1 of the drawing represents in side view the air brake train pipe and the signal pipe extending through one of the cars of the train and connected to the main reservoir of the locomotive, with its various accessory parts. Figs. 2 and 3 are enlarged views of a three-way valve located in the cab of the engine and under control of the engineer by which the signal pipe, and through it the angle-cocks, are put under the control of the engineer. Figs. 4, 4ª and 5 represent the means for extending the engineer's control to the angle-cocks of the brake system, Fig. 4 being a top plan view, partly in section and on an enlarged scale. Fig. 4ª being a detail showing the position of the angle-cock in Fig. 4, and Fig. 5 being a side view of Fig. 4, partly in section.

In order to make my present invention intelligible, it will be necessary to first describe the subject matter of my other application as seen in Figs. 1, 2, and 3.

In the drawing, Fig. 1, A represents the main reservoir located on the locomotive and having the pipe B extending to the engineer's brake valve and the pipe B' extending from the engineer's brake valve to the train pipe T, through which in the usual manner the engineer is enabled to apply the brakes by a reduction of the air pressure in the train pipe.

The train pipe T is connected between the cars with the usual hose pipes and couplings $t$ and said train pipe is also provided at each end on each car with the usual angle cocks $v$, and also for each car the usual connection with the triple valve, not shown.

The signal pipe S extends through the car and is coupled between the cars by means of flexible hose $s$, and has on each car a vertical pipe U provided at the top with a discharge valve $d$, both shown in dotted lines. By means of this discharge pipe $d$ the conductor is enabled to reduce pressure in the signal pipe S and thus communicate with the engineer on the locomotive through the whistle E. The means by which this whistle is rendered operative by a reduction of pressure in the signal pipe is as follows: A pipe 1 connects the main reservoir A with a reducing valve C. This reducing valve on the other side, in the ordinary construction, is connected by a pipe 6, shown in dotted lines, with a signal valve D connecting with the pipe 5 leading to the whistle E. The reducing valve C simply performs the function of taking the air pressure at 70 pounds from the main reservoir A and transmitting it to the signal valve D and the signal pipe S through the connecting pipe 7 at a pressure of 40 pounds. Now if by the operation of a discharge valve $d$ this signal pipe pressure of 40 pounds is suddenly reduced this reduction, manifesting itself through the branch pipe 7 upon the signal valve D, causes a movement of the signal valve which transmits the air to the whistle E in the manner already well known.

In my invention as set forth in my other application, I remove from all of the signal pipes S in each car the stop cocks which are ordinarily employed at the ends of said signal pipe on each car, and instead of having the reducing valve C directly connected with the signal pipe through the connection 7, as shown by dotted lines at 6, Fig. 1, I break away this connecting pipe at 6 and interpose two branch pipes 2 and 3 by means of suitable elbow couplings and extend these branch pipes 2 and 3 up into the cab of the locomotive, and at the ends of these pipes 2 and 3 I connect a three-way valve F, shown in enlarged views in Figs. 2 and 3. This three-way valve consists of a plug F rotating in a casing G whose opposite ends are connected respectively to the two parallel upright pipes 2 and 3. The plug of the valve is provided with a diametrical through-passage $e$, $e^2$ and also with an intersecting right-angular port $e'$ communicating with the passage $e$, $e^2$. On one side of the casing G opposite the plug of the valve is formed a discharge orifice $g$. When the plug valve is in the position shown in Fig. 2 with its handle arm $f$ vertical, the through-passage $e$, $e^2$ is in open communication with the two pipes 2 and 3 and allows the air to pass from the reducing valve to the signal pipe just the same as if there was a direct connection, as shown by the dotted line 6. When, however, the handle arm $f$ of the plug valve is turned to the position shown in Fig. 3, the pipe 2 leading to the reducing valve and to the main reservoir is closed and the pipe 3 connecting the signal pipe is opened to the outer air through the ports $e'$, $e^2$, and the discharge orifice $g$. When in this latter position it will be seen that all the air in the signal pipe is bled from the same through the three-way cock orifice $g$. It will be thus seen that the three-way valve F within the cab enables the engineer to cut off the air from the signal pipe S of the entire train, thus obviating the necessity of stop cocks in this signal pipe at both ends of each car when disconnecting a car from the train. It will also be seen that he is enabled at will to again throw the air into this signal pipe, and thus render the signal pipe operative independently of the memory of the brakeman. In connection with my system it is necessary that the opposite ends of the signal pipe should be capable of closure and for this purpose a stop cock $p'$ is arranged at the front end of the locomotive, and at the rear end of the train a suitable screw plug, cap or dummy coupler $p$ is provided for the hose of the signal pipe at the extreme end of the train.

Referring now to Figs. 4, 4ª and 5, which show my present invention, I will describe how the engineer by the control of air in the signal pipe S is enabled to open all angle-cocks on the train pipe T through which the brakes are applied.

The train pipe T and signal pipe S at each end of the car is provided with an air cylinder H, which by means of a yoke or collar Y is connected to these two pipes. On one side the yoke of the cylinder is formed with an air chest $d$ into which screw the connecting ends of the sections of the signal pipe S. This air chest $d$ communicates through a port $d'$ with the extreme end of cylinder H. Within the cylinder H is arranged a piston I having a hollow piston rod J and in this hollow piston rod rests loosely the end of a push rod K which is connected to an offset of the angle-cock arm M. This arm is rigidly connected to the plug $n$ of the angle-cock, which plug has a passage-way $m$ through it which when turned to the position shown in Figs. 4 and 4ª cuts off the air at this end of the train pipe, and when turned to the position shown in Fig. 5 opens the passage-way for the air through the hose coupling between the cars.

Now having already explained how the engineer controls the admission of the air through the signal pipe S, it will be seen that when air is thus turned on to the signal pipe its pressure through each of the air chests $d$ acts upon each piston I and forcing the same to the left, as indicated in dotted lines in Fig. 4, turns the angle-cock from its closed position shown in Fig. 4ª to its open position shown in Fig. 5, and by a continuance of this pressure locks the parts in the position which insures, after the cars are coupled, that all the angle-cocks are open and, by insuring open continuity in the train pipe, establishes its operative relation to all the triple valves, and all the air brakes of the train. By having the rod K loose in the hollow rod of the piston, the piston acts on the angle-cock by a pushing movement only, so that the angle-cock may be manipulated independently by hand.

It will be understood that the train pipe is to have a dummy coupler or closing plug on the rear car, in order to close the rear end of the train pipe.

I do not claim broadly operating the angle-cocks by air taken directly from the train pipe as this is shown in my Patent No. 696,803, of August 1, 1902.

I claim—

1. The combination with the train pipe and its angle-cocks; of a signal pipe arranged beside the train pipe, and pneumatic means for operating the angle-cocks connected to and made operable through the signal pipe.

2. An angle-cock adjuster comprising the combination with the train pipe and angle-cock; of a pneumatic cylinder and piston, means connecting the piston to the angle-cock, a signal pipe arranged beside the train pipe and communicating with the cylinder, and a valve on the locomotive for applying and removing pressure from the signal pipe.

3. The combination of a signal pipe extending through the train, and a valve located on the locomotive, arranged to simultaneously cut off connection between the signal pipe and air supply and bleed the signal pipe, a train pipe with angle-cocks, and pneumatic means for operating the angle-cocks through the signal pipe.

4. In a pneumatic signal and brake system for railroad cars, the combination with the signal air pipe, the main air reservoir, the reducing valve, the signal valve and whistle; means for cutting off communication between the reducing valve and signal pipe and discharging the air from the signal pipe, said means being located on the locomotive and under the control of the engineer, a train pipe with angle-cocks, and pneumatic means for operating the angle-cocks through the signal pipe.

5. In a pneumatic signal and brake system for railroad cars, the combination with the signal air pipe, the main reservoir, the reducing valve, the signal valve and whistle; of a three-way cock located in a pipe between the reducing valve and the signal pipe, a train pipe with angle-cocks, and pneumatic means for operating the angle-cocks through the signal pipe.

6. In a pneumatic signal and brake system for railroad cars, the combination with the signal air pipe, the main reservoir, the reducing valve, the signal valve and whistle; of two branch pipes connected, one to the low pressure side of the reducing valve and the other to the signal pipe, said two branch pipes being extended to the cab of the engine and provided with a three-way cock adapted to open communication between said branch pipes, or close the same and open the signal pipe to the outer air, a train pipe with angle-cocks and pneumatic means for operating the angle-cocks through the signal pipe.

WILLIAM S. DE CAMP.

Witnesses:
EDWARD MERKLE,
LOUIS RICHARD.